United States Patent [19]

Kuroda et al.

[11] Patent Number: 5,083,289
[45] Date of Patent: Jan. 21, 1992

[54] OPTICAL CALORIMETER SYSTEM FOR EXECUTING REAL AND SHORT TIME CALORIMETRIC MEASUREMENT OF THE OPTICAL POWER

[75] Inventors: Kenji Kuroda, Hadano; Koki Sasaki, Atsugi, both of Japan

[73] Assignee: Anritsu Corporation, Tokyo, Japan

[21] Appl. No.: 471,839

[22] Filed: Jan. 29, 1990

[30] Foreign Application Priority Data

Jan. 31, 1989 [JP] Japan .................................. 1-19807

[51] Int. Cl.$^5$ ........................ G01K 17/08; G06F 15/20
[52] U.S. Cl. .................................. 364/557; 364/556; 374/32; 374/33
[58] Field of Search ............................ 374/32, 33, 34; 364/556, 557; 250/252.1, 338.1

[56] References Cited

U.S. PATENT DOCUMENTS

| | | |
|---|---|---|
| 3,575,048 | 4/1971 | DeBenedictis . |
| 4,140,396 | 2/1979 | Allington ................ 374/34 |
| 4,440,506 | 4/1984 | Eitel . |
| 4,726,688 | 2/1988 | Ruel . |
| 4,765,749 | 8/1988 | Bourgade et al. ............... 374/32 |
| 4,770,541 | 9/1988 | Fedter et al. ................. 374/32 |

OTHER PUBLICATIONS

Bulletin of the Electrotechnical Laboratory-No. 7, vol. 50, 1986.

Bulletin of the Electrotechnical Laboratory-No. 4, vol. 50, 1986.

*Primary Examiner*—Parshotam S. Lall
*Assistant Examiner*—V. Trans
*Attorney, Agent, or Firm*—Frishauf, Holtz, Goodman & Woodward

[57] ABSTRACT

A temperature reference jacket includes an optical absorber for executing calorimetric measurement of optical power to be measured, a heater, a cooler, and a temperature sensor. The monitor monitors the optical power to be measured. A shutter selectively transmits/shields the optical power to be measured with respect to the optical absorber. A memory stores a first control amount for the cooler corresponding to the optical power to be measured and second and third control amounts for the heater in advance. A controller controls opening/closing of the shutter, reads out the first and second control amounts from the memory in accordance with the monitoring result from the monitor while the shutter is closed, and reading out the first and third control amounts from the memory while the shutter is open. The controller finely adjusts a voltage for the heater so that the temperature reference jacket and the optical absorber are set in an isothermal state while the shutter is closed and open, respectively. A data processor calculates the optical power to be measured in accordance with first and second isothermal control amounts for the voltage of the heater when the isothermal state is obtained while the shutter is closed and open, respectively.

10 Claims, 13 Drawing Sheets

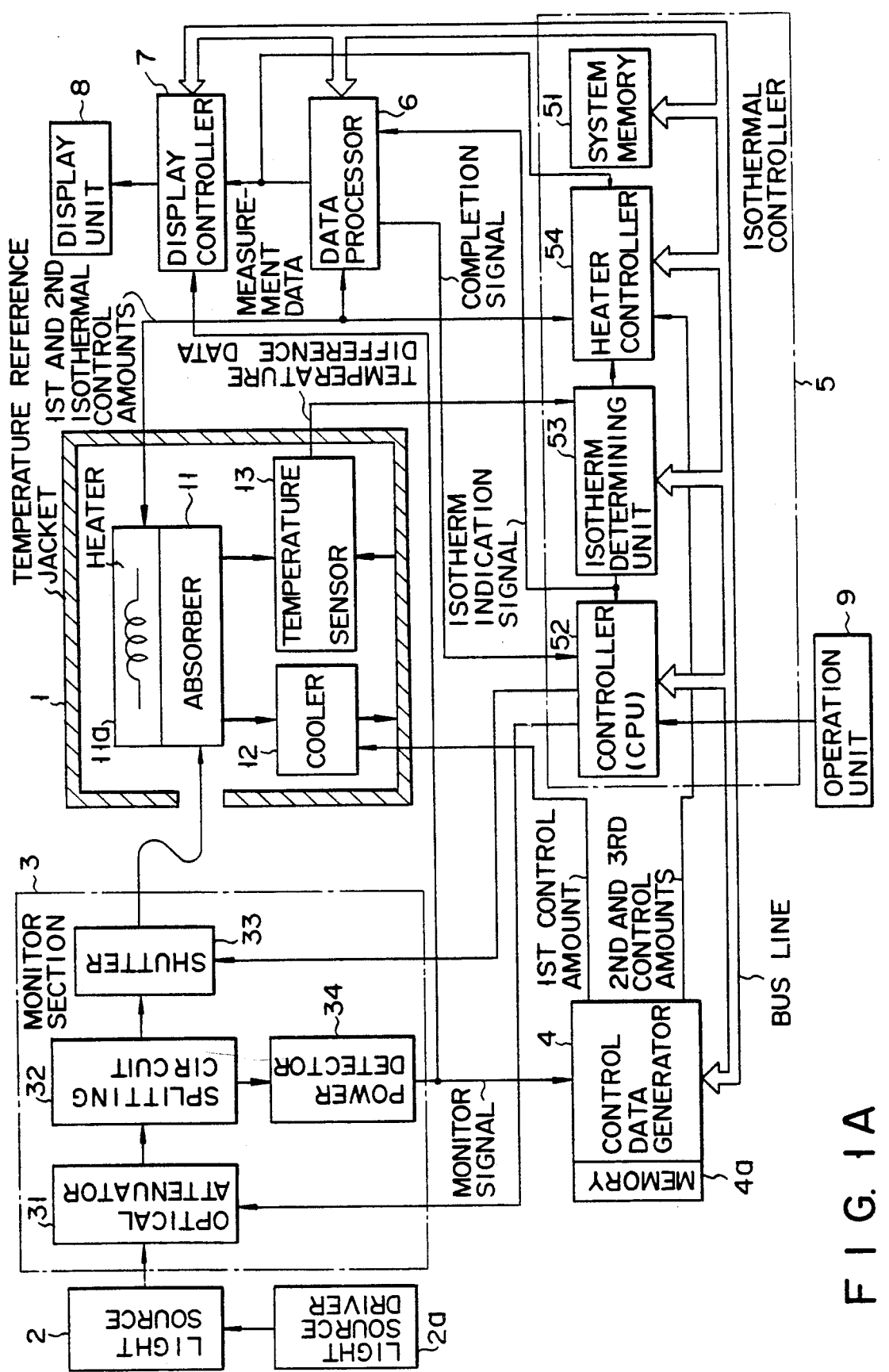
F I G. 1A

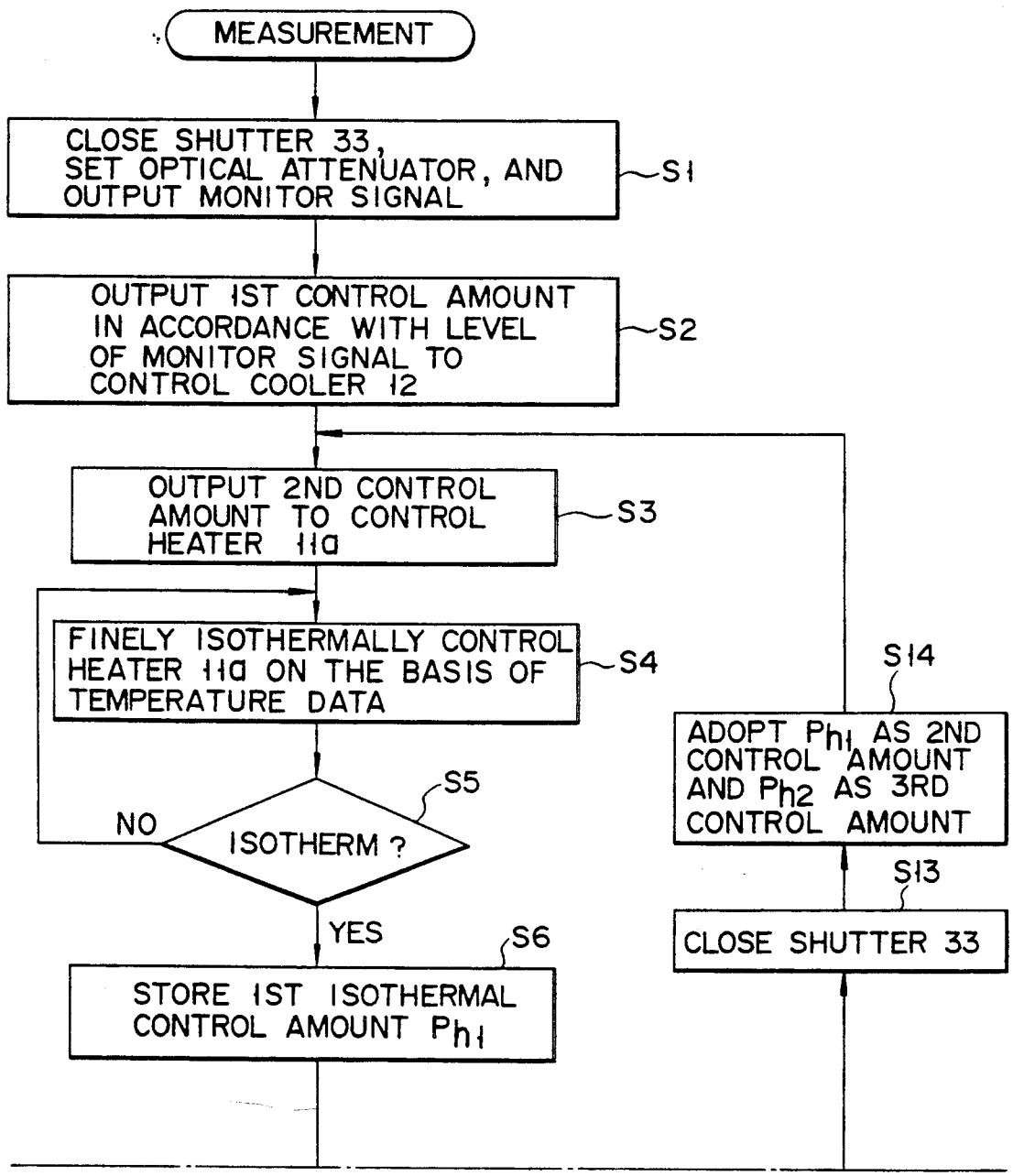
F I G. 2Ai

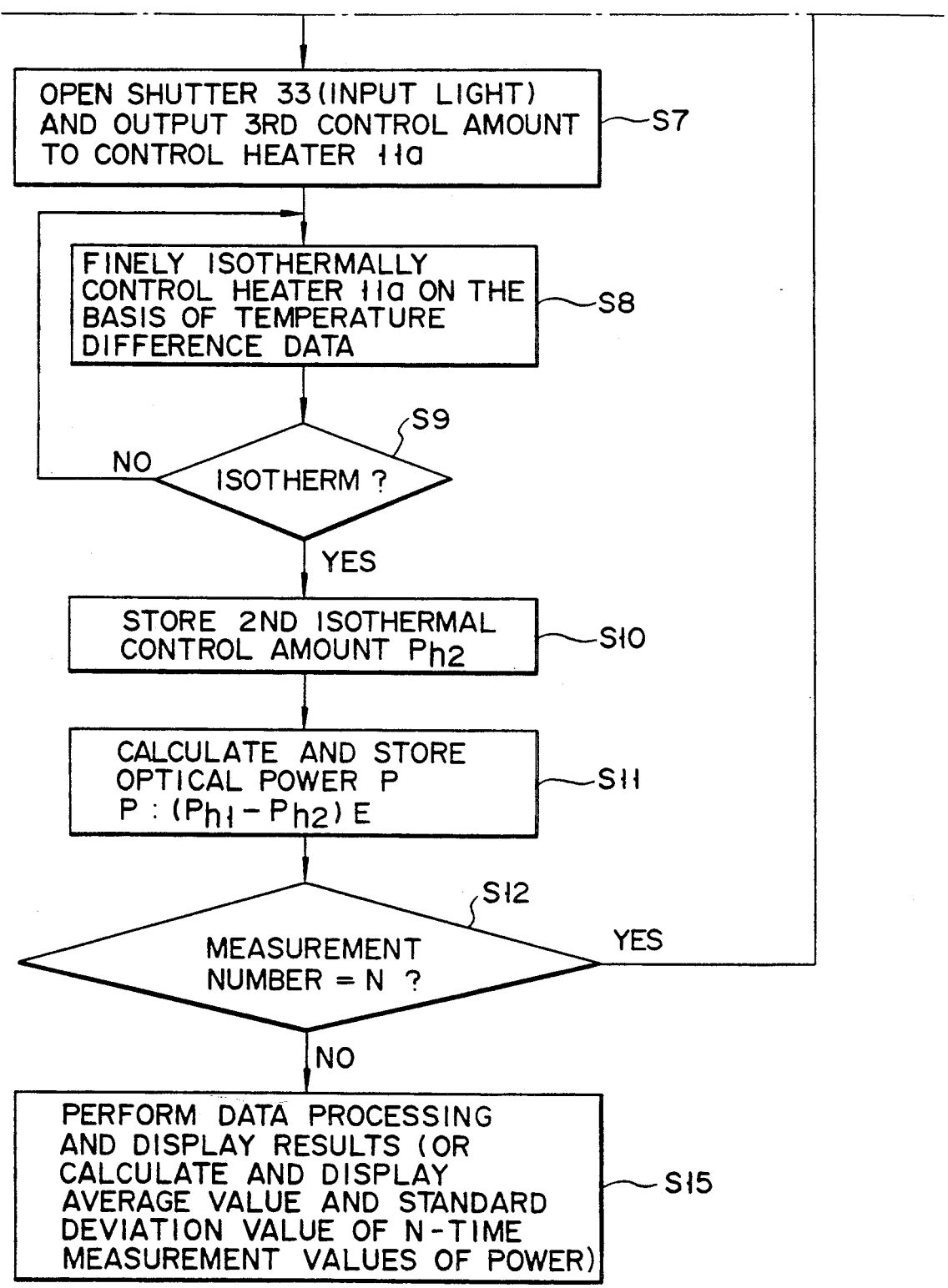
FIG. 2Aii

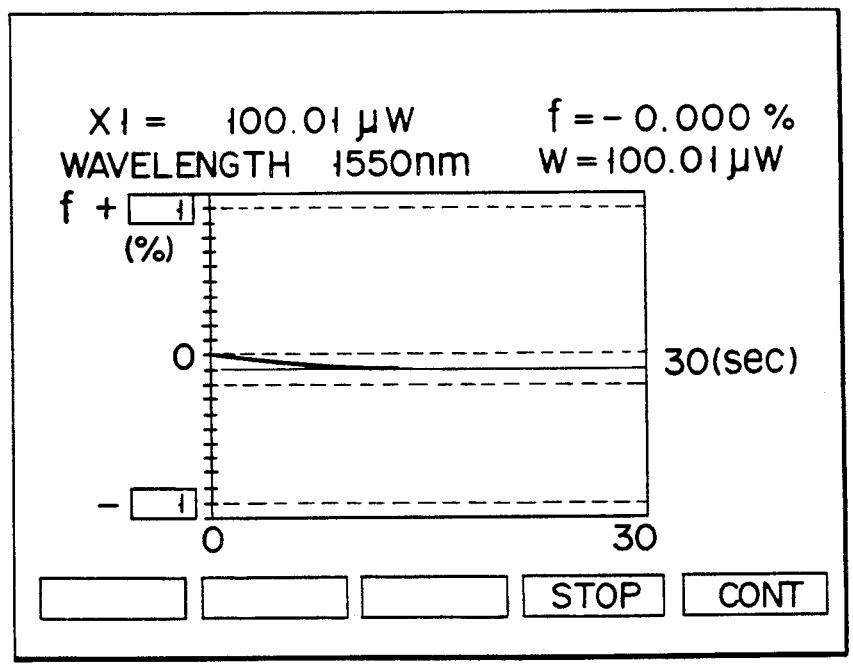
F I G. 2B
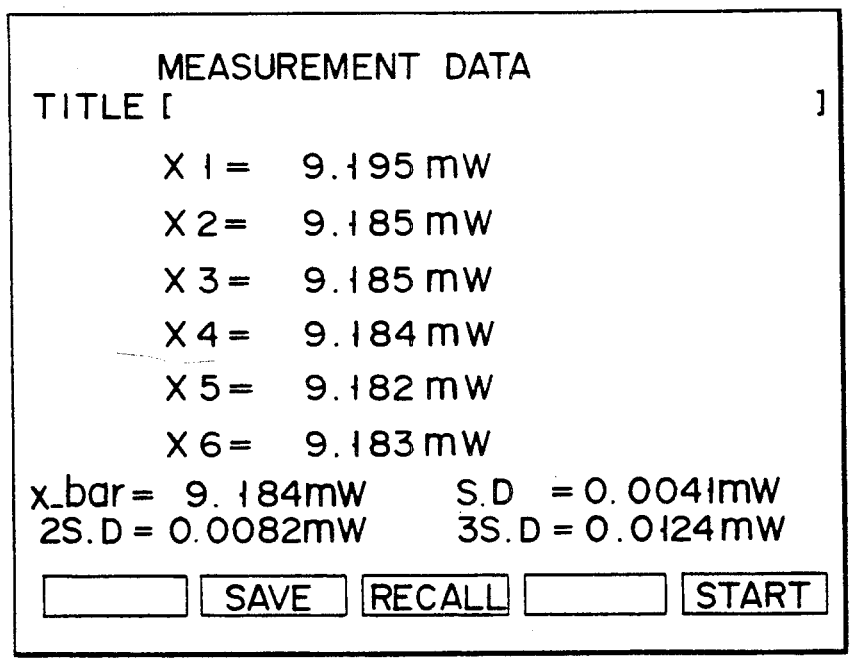
F I G. 2C

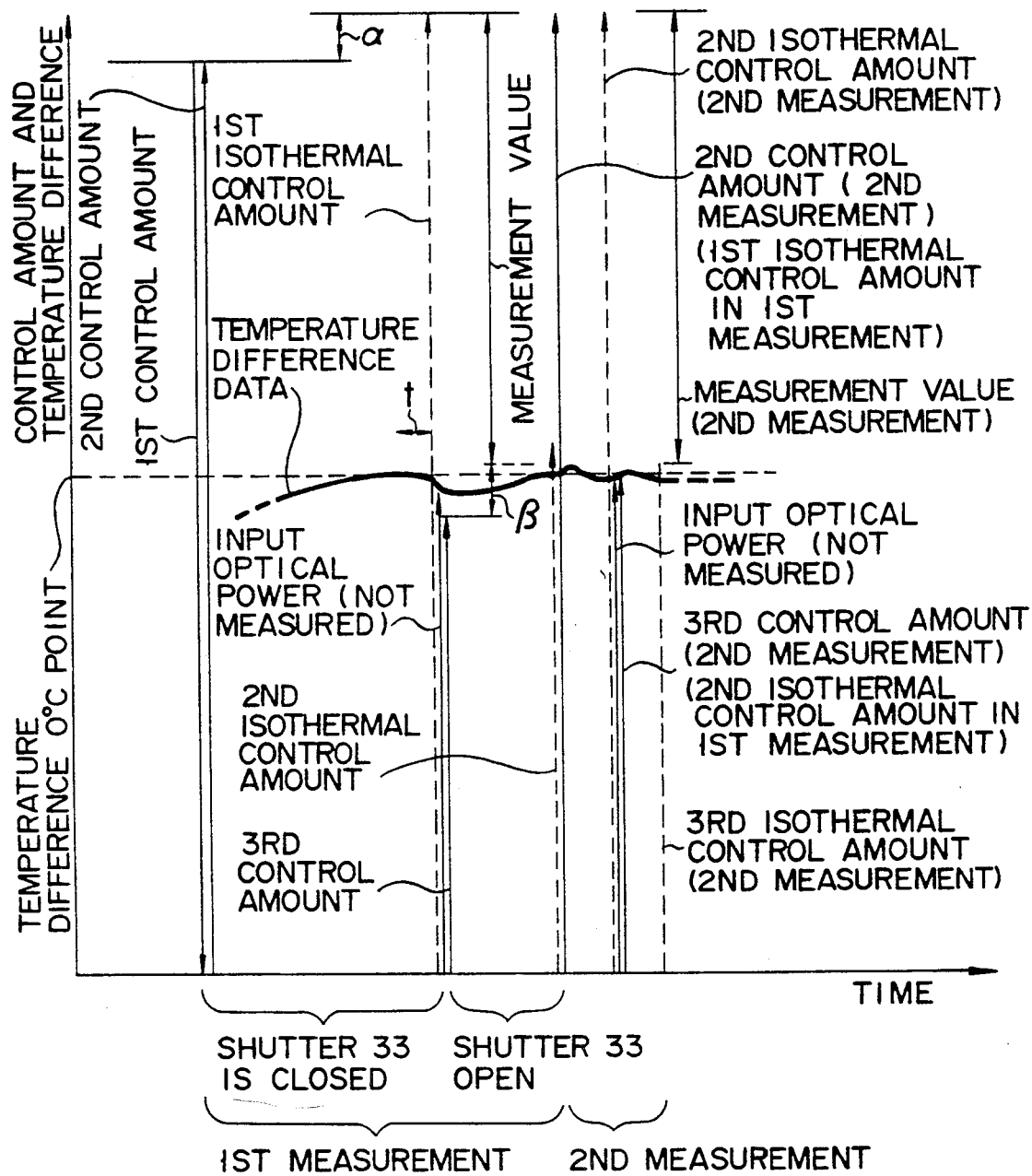
F I G. 3A

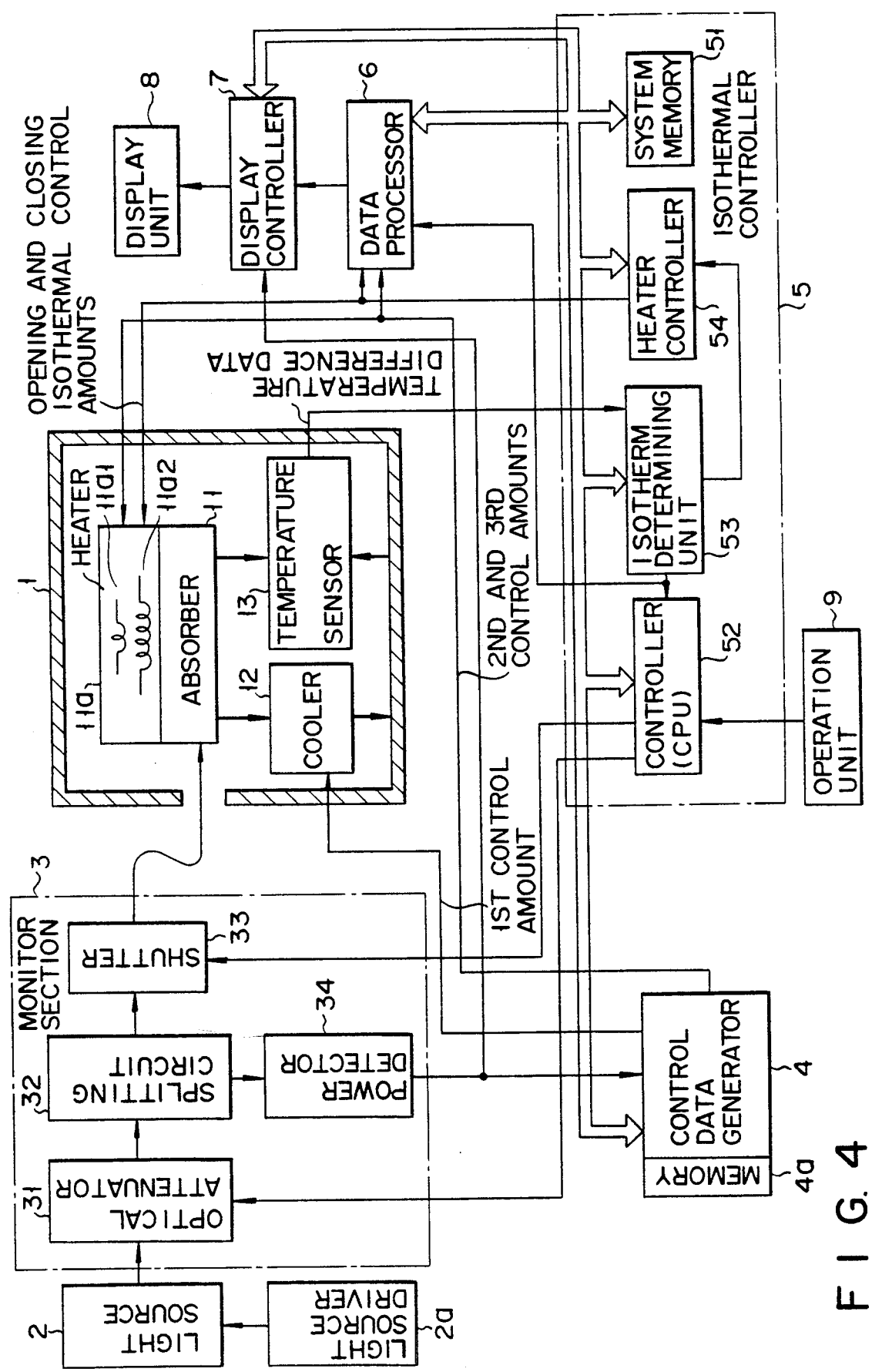
F I G. 4

OPTICAL CALORIMETER SYSTEM FOR EXECUTING REAL AND SHORT TIME CALORIMETRIC MEASUREMENT OF THE OPTICAL POWER

BACKGROUND OF THE INVENTION

1. Field of the Invention

The present invention generally relates to an optical calorimeter system and, more particularly, to an optical calorimeter system for executing a real and short time calorimetric measurement of optical power.

2. Description of the Related Art

In measurement of optical power such as laser beam, calorimetric measurement executed by using an optical calorimeter is known as a method of executing very precise measurement corresponding to a primary standard level of a national agency.

The calorimetric measurement is a technique in which optical power is substituted into the calories and then direct current substitution is executed to measure the optical power.

In the calorimetric measurement as described above, however, a complicated operation is generally required, and a long time up to about one hour is necessary. That is, in the former systems, a high-precision optical power meter becomes expensive, and an expert skilled in the measurement is required, resulting in disadvantages for a user. Also, an error factor is increased, so that precise measurement can not easily executed.

A cause for such problems in the calorimetric measurement will be described below.

FIG. 5 shows an arrangement of calorimetric measurement executed by using a general calorimeter. In this arrangement, a temperature reference jacket 1 incorporates an absorber 11 having a heater 11a, a cooler 12, and a temperature sensor 13. The jacket 1 and the absorber 11 are connected by a thermal circuit via the cooler 12 and by a thermal circuit via the sensor 13. The absorber 11 converts input optical power into calories. Reference numeral 100 denotes a controller for controlling the heater 11a and the cooler 12 in accordance with an output from the sensor 13.

Referring to FIG. 5, while input light L is off, the controller 100 controls the cooler 12 and the heater 11a by a control amount slightly higher than the power of the input light L. Thereafter, the controller 100 PID-controls (proportional, integral and differential controls) the heater 11a on the basis of temperature difference data from the sensor 13 while maintaining the control amount for the cooler 12 at a predetermined value, thereby obtaining a temperature equilibrium between the absorber 11 and the jacket 1. The controller 100 records a first control amount $P_{h1}$ used to control the heater 11a when the temperature equilibrium is obtained.

The input light L is then input, and the controller 100 PID-controls the heater 11a on the basis of the temperature difference data from the sensor 13 while maintaining the control amount for the cooler 12, thereby obtaining a temperature equilibrium between the absorber 11 and the jacket 1. The controller 100 records a second control amount $P_{h2}$ used to control the heater 11a when the temperature equilibrium is obtained.

The controller 100 calculates power $P_i$ of the light input to the absorber 11 on the basis of the first and second control amounts by using the following equation:

$$P_i = E(P_{h1} - P_{h2}) + P_r \tag{1}$$

where E is the ratio of the optical power input to the absorber 11 to DC power consumed by the heater 11a so as to be equal to a temperature given by the optical power. This ratio is measured and known in advance.

$P_r$ is the optical power value not perfectly absorbed but reflected by the absorber. $P_r$ is an error factor and must be designed to be small. $P_r$ will be neglected in the following description.

To precisely the optical power, it is necessary to carry out a calorimetric measurement. That is to say, it is required to obtain a temperature equilibrium (temperature equalized) state upon PID control executed by the controller 100. This is a cause of a long measurement time (about one hour for each measurement). That is, unbalance is present in initial values set for the cooler 12 and the heater 11a by the controller 100, and the controller 100 performs PID control at a higher response speed than the time constant of the temperature difference sensor 13 for detecting a temperature difference between the cooler and the heater thereafter. Therefore, a very long time period is required until a ringing phenomenon in which overshooting and undershooting are repeated in temperature difference data between the cooler and the heater occurs to eliminate the temperature difference (actually, the temperature difference is converged within a predetermined allowable difference range).

A demand has arisen, therefore, for a system capable of reducing the measurement time and facilitating an operation.

A conventional calorimetric measurement system capable of measuring precise the optical power is disclosed as "Automatic Calibration Systems for Laser Power Standard (I) and (II)" in "Bulletin of the Electrotechnical Laboratory", Vol. 50, Nos. 4 and 7.

In the conventional calibration system (I), laser power is measured by a calorimeter as the primary standard. Then, an object power measurement equipment is set substitute the calorimeter and output optical power of measurement is executed. Calibration coefficients are determined from the ratio of optical power measurement results as above described. However, in this system (I), there is a problem that a direct error occurs in stability of laser power, during the long time (about one hour) which is spent for the measurement, thereby reducing the measurement time.

In this system (II) so as to use a secondary standard, the operation is performed in order to obtain the effective efficiency of a thermopile (corresponding to the absorber 11 described above) by the calorimetric measurement, and execute a comparison measurement by a thermo electric power only. That is, system (II) has a merit that the comparison measurement can be executed in a short time, but has a demerit that an error occurs since the calibration of optical power is executed without using the calorimetric measurement.

The present invention intends to provide a method of measuring optical power by using a calorimeter, in which all measurements are executed by calorimetric measurements without executing any preliminary measurement as described above, thereby reducing a measurement time, and an apparatus therefor.

SUMMARY OF THE INVENTION

It is therefore, an object of the present invention to provide a new and improved optical calorimeter system for executing a real and short time calorimetric measurement of optical power.

According to one aspect of the present invention, there is provided a method for measuring optical power using an optical calorimeter which has a temperature reference jacket including an optical absorber for absorbing optical power to be measured and generating heat, an electronic cooler and an electric heater thermally connected to said optical absorber, and a temperature sensor for detecting a temperature difference between said temperature reference jacket and said optical absorber, the method comprising:

storing in advance first, second, and third control amounts corresponding to an optical power to be measured, the first and second control amounts being stored as a cooler power for said electronic cooler and a heater power for said electric heater sufficient to control said optical calorimeter in a substantially isothermal state between optical absorber and said temperature reference jacket, and the third control amount being stored as a heater power for said electric heater corresponding to the optical power to be measured;

monitoring the optical power to be measured while the optical power to be measured is transmitted to or shielded from said optical absorber of said optical calorimeter;

first controlling said optical calorimeter in the substantially isothermal state by reading out the first and second control amounts and supplying the first and second control amounts at substantially the same time to said electronic cooler and to said electric heater, in accordance with the monitoring results of the optical power to be measured, and by finely adjusting the heater power in accordance with the temperature difference from said temperature sensor, while the optical power to be measured is shielded from said optical absorber of said optical calorimeter;

first detecting a first isothermal control amount for the heater power obtained when the substantially isothermal state is achieved in said first controlling step;

second controlling said optical calorimeter in the substantially isothermal state by continuously supplying the first control amount to said electronic cooler, reading out the third control amount instead of the second control amount and supplying the third control amount to said electric heater, and by finely adjusting the heater power in accordance with the thermal difference from said temperature sensor, while the optical power to be measured is transmitted to said optical absorber of said optical calorimeter;

second detecting a second isothermal control amount for the heater power obtained when the substantially isothermal state is achieved in said second controlling step; and calculating the optical power to be measured in accordance with the first and second isothermal control amounts for the heater power, detected in said first and second detecting steps.

According to another aspect of the present invention, there is provided a calorimetric optical power measuring apparatus comprising:

a temperature reference jacket including an optical absorber for absorbing optical power to be measured and generating heat, an electronic cooler and an electric heater thermally connected to the optical absorber, and a temperature sensor for detecting a temperature difference between the temperature reference jacket and the optical absorber;

monitoring means for monitoring the optical power to be measured;

optical path control means for selectively transmitting or shielding the optical power to be measured with respect to the optical absorber in the temperature reference jacket;

memory means for storing first, second, and third control amounts corresponding to the optical power to be measured in advance, the first and second control amounts being stored as a cooler power for the electronic cooler and a heater power for the electric heater sufficient to control the temperature reference jacket and the light absorber in a substantially isothermal state, and the third control amount being stored as a heater power for the electric heater corresponding to the optical power to be measured, first control means for supplying a first control signal for shielding off the optical power to be measured from the optical absorber to the optical path control means, for outputting, in accordance with the monitoring results of the optical power to be measured from the monitoring means, a second control signal for reading out corresponding first and second control amounts from the memory means and supplying the first and second control amounts to the electronic cooler and the electric heater at substantially the same time, and for outputting, in accordance with temperature difference data from the temperature sensor, a third control signal for finely adjusting the electric heater so that the temperature reference jacket and the optical absorber in the isothermal state, the first control means including isotherm determining means for determining the isothermal state in accordance with the temperature difference data while the light to be measured is shielded to the optical absorber;

second control means for supplying, in accordance with the result from the isothermal determining means of the first control means, to the optical path control means, a fourth control signal for transmitting the optical power to be measured to the optical absorber in the temperature reference jacket to the optical path control means, for outputting, in accordance with the monitoring result of the optical power to be measured from the monitoring means, a fifth control signal for reading out corresponding first and third control amounts from the memory means and supplying the first and third control amounts to the electronic cooler and the electric heater, and outputting, in accordance with temperature difference data from the temperature sensor, a sixth control signal for finely adjusting the electric heater so that the temperature reference jacket and the optical absorber are controlled in the isothermal state, the second control means including isotherm determining means for determining the isothermal state in accordance with the temperature difference data while the optical power to be measured is incident on the optical absorber; and data processing means for storing a first isothermal control amount for the heater power obtained when the isotherm determining means of the first control means is determined the isothermal state and a second isothermal control amount for the heater power obtained when the isotherm determining means of the second control means is determined the isothermal state, and calculating the optical power to be measured in accordance with the first and second isothermal control amounts.

In order to achieve the above objects, the present invention uses means for monitoring the optical power of input light and outputting it as a monitor signal, and setting and measuring initial conditions upon measurement by using the monitor signal, and means for executing all measurements by calorimetric measurements, i.e., isothermal control.

More specifically, the present invention comprises a temperature reference jacket having an optical absorber, a heater, a cooler, and a temperature sensor, a monitor section having a power detector for monitoring the optical power of input light and an opening and closing unit for opening and closing an optical path, a control data generator for generating the initial conditions, an isothermal control section for controlling the temperatures of the temperature reference jacket and the optical absorber to be equal to each other, and a data processing section for calculating the optical power of the input light basis of first and second isothermal control amounts.

In this arrangement, the control data generator has memory data actually measured beforehand and outputs the memory data as first and second control amounts as the initial conditions on the basis of optical power detected by the power detector. The first control amount is directly output to control the cooler. The second and third control amounts for controlling the heater is selectively output to the isothermal control section.

The isothermal control section performs the following two-step measurement control in accordance with opening or closing of the opening and closing unit.

When the opening and closing unit is closed, the isothermal control section receives the second control amount from the control data generator to control the heater. Thereafter, the isothermal control section finely controls the heater on the basis of temperature difference data from the temperature sensor to obtain temperature equilibrium between the optical absorber and the temperature reference jacket, and the data processing section stores a total control amount used to control the heater when the temperature equilibrium is obtained as the first isothermal control amount.

When the opening and closing unit is open, the isothermal control section receives the third control amount from the control data generator to control the heater. Thereafter, the isothermal control section finely controls the heater on the basis of the temperature difference data from the temperature sensor to obtain temperature equilibrium between the optical absorber and the temperature reference jacket, and the data processing section stores a total control amount used to control the heater when the temperature equilibrium is obtained as the second isothermal control amount.

The present invention is realized as a method and apparatus for calculating optical power input to the temperature reference jacket on the basis of the first and second isothermal control amounts output by the data processing section.

As described above, according to the present invention, the control data generator for generating initial conditions for measurement corresponding to input optical power is used to set the initial conditions on the basis of a monitor signal to perform isothermal control, thereby precisely measuring the optical power. Therefore, since PID control performed in the conventional techniques need not be adopted, the measurement can be executed at a very high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A, 1B, and 1C are a block diagram showing a schematic arrangement of the first embodiment, a block diagram showing its detailed arrangement, and a perspective view showing outer appearances of its respective sections, respectively;

FIGS. 2Ai and 2Aii, 2B, and 2C are flow charts for explaining an operation of the first embodiment shown in FIGS. 1A to 1C, a view showing a display upon isothermal control, and a view showing a display upon optical power measurement, respectively;

FIGS. 3A to 3C are views schematically showing operations and effects of the first embodiment shown in FIGS. 1A to 1C;

FIG. 4 is a view showing a schematic arrangement according to the second embodiment.

DETAILED DESCRIPTION OF THE PREFERRED EMBODIMENTS

Figure 1B:
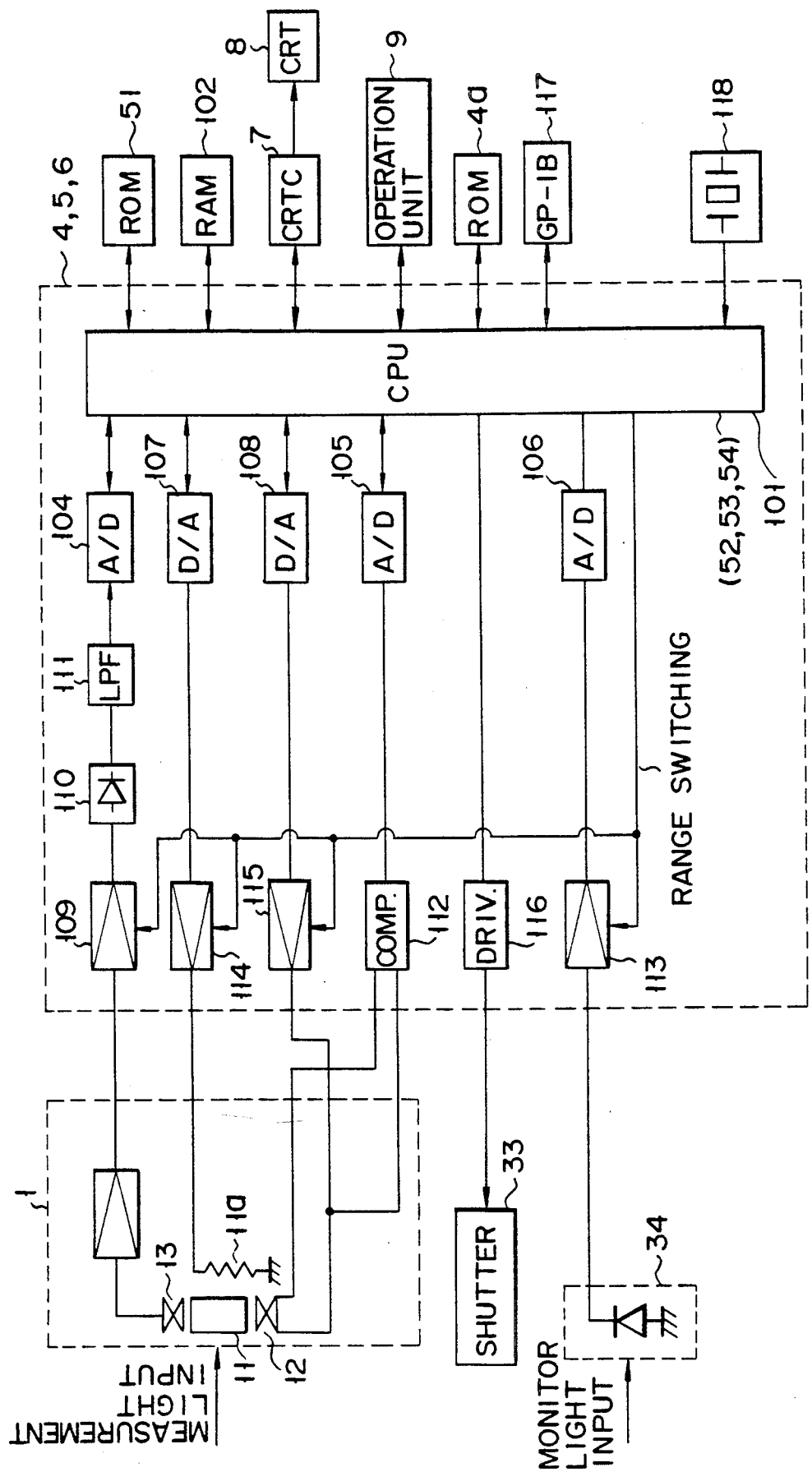

Reference will now be made in detail to the presently preferred embodiments of the invention as illustrated in the accompanying drawings, in which like reference characters designate like or corresponding parts throughout the several drawings.

The present invention includes both a method of measuring optical power by calorimetric measurement as an optical calorimeter system and an apparatus therefor. Since, however, the method is the same as an operation process of the apparatus, both the method and apparatus will be incorporated in the following description of the embodiments.

FIRST EMBODIMENT

FIG. 1A is a view showing a schematic arrangement of the first embodiment of the present invention which is capable of executing automatic measurement.

Figure 5:
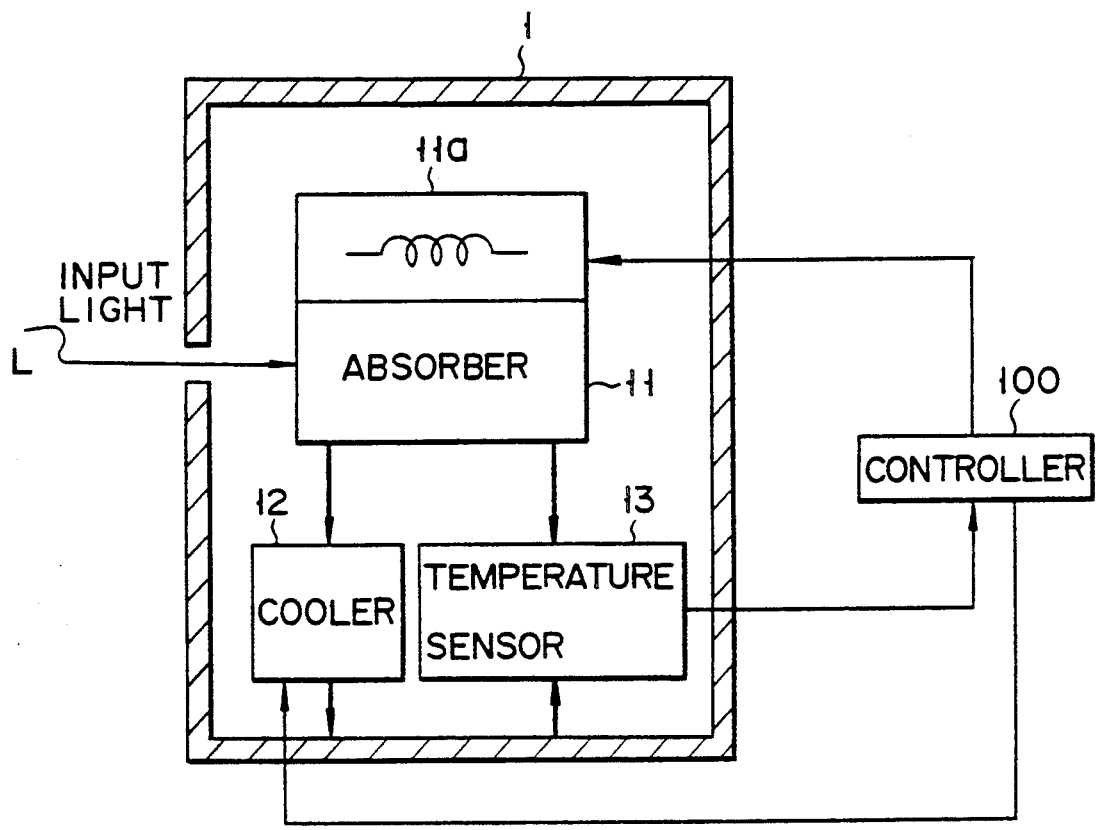
FIG. 5 is a view showing a conventional temperature reference jacket.

Referring to FIG. 1A, functions of a temperature reference jacket 1, an optical absorber 11 having an electric heater 11a, an electronic cooler 12, and a temperature sensor 13 are the same as those described in the conventional technique shown in FIG. 5.

A light source 2 is arranged to output collimated light having a predetermined wavelength with stable power and may be, e.g., a semiconductor laser or a gas laser.

A monitor section 3 is a unit including an optical attenuator 31, a splitting circuit 32, a shutter 33, and a power detector 34. The optical attenuator 31 is a power varying means for adjusting optical power from the light source 2 to be a predetermined value and outputting it, thereby setting the optical power. The splitting circuit 32 splits the light from the optical attenuator 31 in two directions and outputs them. The shutter 33 includes a shutter mechanism, located on an optical path formed between-one output terminal of the splitting circuit 32 and the absorber 11 in the jacket 1, for opening/closing the optical path on the basis of an electrical signal from a controller 52 (to be described later). The power detector 34 converts the optical power output from the other output terminal of the splitting circuit 32 into an electrical signal and outputs the electrical signal as a monitor signal. In this embodiment, the power detector 34 is constituted by a semiconductor photoelectric converting element.

A control data generator 4 receives the monitor signal from the power detector 34 and outputs control data corresponding to the signal level. The control data includes at least three types, i.e., a first control amount for controlling power to the cooler 12 and second and third control amounts for controlling power to the heater 11a via a heater controller 54. In this embodiment, the control data generator 4 includes an internal memory 4a. Each control amount is stored in the memory 4a to be read out corresponding to the level of the monitor signal.

An isothermal control section 5 comprises a microcomputer and its peripheral circuits. In this embodiment, the section 5 is constituted by functional blocks, i.e., a system memory 51, a controller 52, an isotherm determining unit 53, and a heater controller 54. The controller 52 reads out system programs for causing the system to perform a systematic operation and executing automatic measurement from the system memory 51, and performs scheduling of the respective sections constituting this embodiment and controls them. The isotherm determining unit 53 includes an error amplifier, an A/D converter, a comparator, and the like. The unit 53 checks on the basis of temperature difference data from the temperature sensor 13 whether the temperatures of the jacket 1 and the absorber 11 are equalized. The isotherm determining unit 53 outputs the determination result to a data processor 6 as an isotherm indication signal, and outputs its temperature difference data to the heater controller 54. In accordance with the input temperature difference data, the controller 54 controls the heater 11a such that the temperature difference becomes zero. The data processor 6 has a memory for storing a control amount of the heater controller 54 used to control the heater 11a when the isotherm determining unit 53 determines isotherm, and calculate optical power input to the absorber 11 on the basis of the stored control amount by the equation (1) described above (as will be described in detail later).

The display controller 7 causes a display unit 8 to display the measured optical power measured in accordance with measurement items and conditions such as a wavelength, a power level of input light, and a measurement date set by an operation unit 9, an output signal from the isotherm determining unit 53, a monitor signal, a measurement menu, and the like.

The operation unit 9 is used to select or set the measurement items and conditions as described above and provided on a panel (not shown).

In the above arrangement, the control data generator 4, the isothermal control section 5, and the data processor 6 are constituted by including a CPU 101, and the CPU 101 is connected to a RAM 102, ROMs 102 and 4a, and the like, as shown in FIG. 1B. Therefore, as shown in FIG. 1B, in order to match the interface, A/D converters 104 to 106 and D/A converters 107 and 108 are provided at the inputs and outputs as needed.

That is, referring to FIG. 1B, the A/D converter 104 retrieves and A/D-converts an output from the temperature sensor 13 via an amplifier 109, a sync detector 110, and a low-pass filter 111. The A/D converter 105 retrieves and A/D-converts two outputs from the cooler (Peltier effect element) 12 via a comparator 112. The A/D converter 106 retrieves and A/D-converts an output from the power detector (photodiode) 34 via an amplifier 113. The D/A converter 107 D/A-converts heater control data from the CPU 101 and supplies it to the heater 11a via a constant-voltage source amplifier 114. The D/A converter 108 D/A-converts cooler control data from the CPU 101 and supplies it to the cooler 12 via a constant-current source amplifier 115. The amplifiers 109, 113, 114, and 115 are divided into four ranges, e.g., range 0, range 1, range 2, and range 3 in accordance with the levels of optical power to be measured. The gain of each amplifier is controlled by a range switching signal output from the CPU 101. The CPU 101 supplies a shutter drive signal capable of switching the shutter 33 from a closed to open state at a high speed of about 1/100 second. The display unit 8 is connected to the CPU 101 via the display controller 7, and a GP-IB 117 for external communication and an oscillator 118 for generating a system clock are connected in addition to the operation unit 9 to the CPU 101.

Figure 1C:
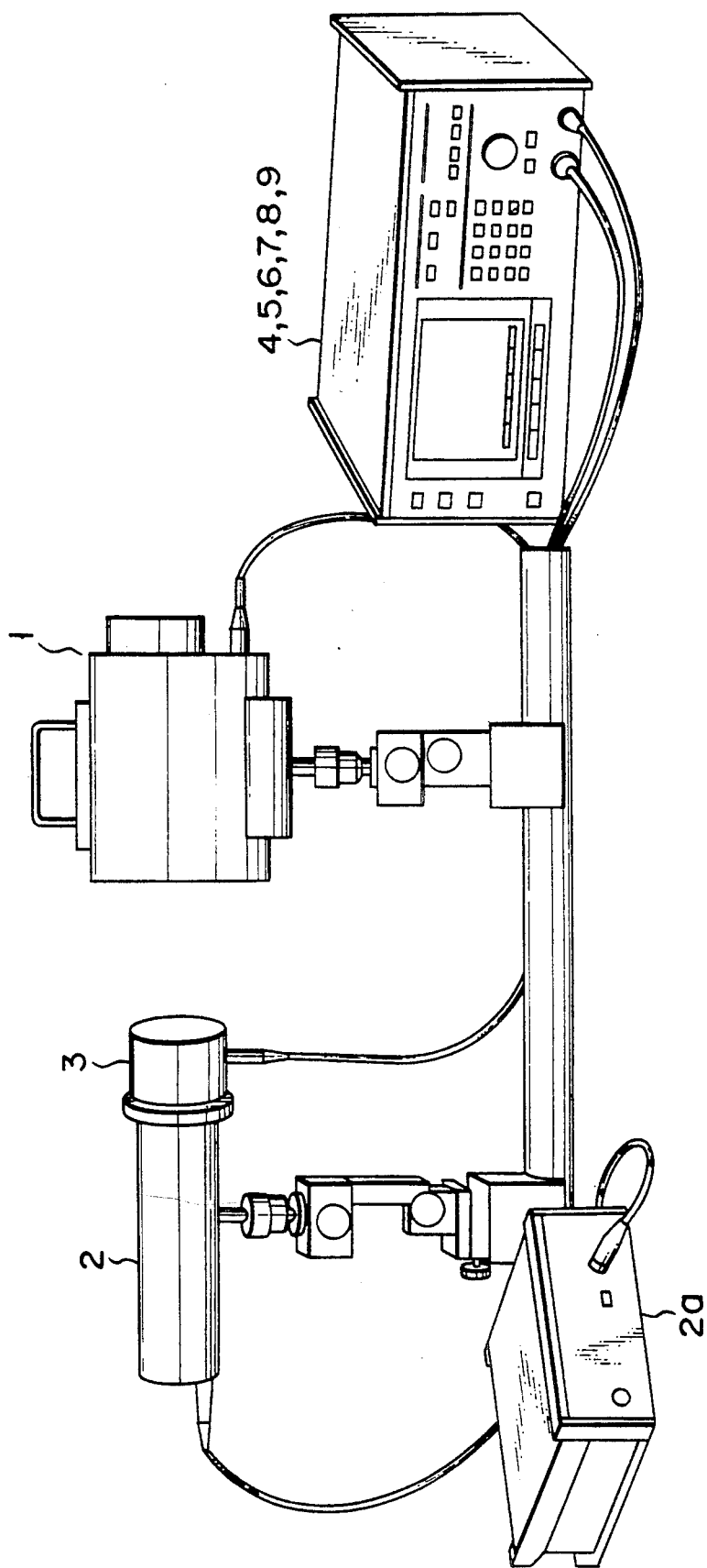

As shown in FIG. 1C, the structure of this embodiment is constituted by four units, i.e., a unit of the temperature reference jacket 1, a unit of a light source driver 2a, a unit of the light source 2 and the monitor section 3, and a unit of the control data generator 4, the isothermal controller 5, the data processor 6, the display controller 7, the display unit 8, and the operation unit 9. The unit of the control data generator 4, the isothermal controller 5, the data processor 6, the display controller 7, the display unit 8, and the operation unit 9 realize an improvement in operability and compactness of the apparatus and versatility i future high-precision measurement.

An operation of the embodiment will be described in detail below with reference to the arrangements shown in FIGS. 1A to 1C and flow charts shown in FIGS. 2Ai and 2Aii. Note that in FIG. 1A, although signal and control lines particularly related to the present invention are distinguished from a bus line for easier understanding of the flow charts in FIGS. 2Ai and 2Aii, they need not be distinguished as a product. In addition, reference symbols S1 to S15 in FIGS. 2Ai and 2Aii denote steps to be described later.

The first, second, and third control amounts stored beforehand in the memory 4a of the control data generator 4 and generated as needed are control amounts expected to be capable of controlling power to the cooler 12 and the heater 11a such that the temperatures of the temperature reference jacket 1 and the absorber 11 are equalized when optical power having a predetermined level is input to the absorber 11. More specifically, when predetermined optical power $P_i$ is expected to be input to the absorber 11, the first control amount is $-2P_a$ (in this case, since $P_i$ is not exactly measured, $P_a$ is an expected value and has a value close to $P_i$. Signs − and + indicate cooling by the cooler 12 and heating by the heater 11a, respectively), the second control amount is $+2P_a$, and the third control amount is $+P_a$.

These control amounts are actually measured in advance for each of the ranges 0 to 3 and stored in the memory 4a of the control data generator 4 in the form of a table as shown in Table 1. Since losses in the power detector 34, the splitting circuit 32, and the shutter 33 are known, a relationship between the level of the monitor signal and the optical power input to the absorber 11 can be obtained beforehand. Therefore, the control amounts read out from the memory 4a of the control data generator 4 in accordance with the level of the monitor signal corresponds to the optical power input to the absorber 11. The arrangement may be altered such that the control data generator 4 stores control amounts corresponding to the level of the monitor signal, and after the control amounts are read out, performs processing corresponding to the relationship with respect to the optical power input to the absorber 11, and outputs the control amounts.

The control data generator 4 is arranged to output the control amounts in accordance with the level of the monitor signal.

In Table 1 to be presented below, a portion indicated by a symbol * denotes a measurement point used when calibration is performed in accordance with a measurement region (to be described later), and the other portion is interporatively calculated by an approximation based on actually measured value by the CPU 101. This is the same when an intermediate value of the optical power is set in table. The third control amount is set lower than the second control amount by a voltage corresponding to the optical power to be measured.

TABLE 1

| | Optical Power To Be Measured Or Monitor Power (mW) | 1st Control Amount Cooler Current (mA) | 2nd Control Amount | 3rd Control Amount |
|---|---|---|---|---|
| | | | Heater Voltage (V) | |
| * | 0.1 | 0.525 | 0.2945 | 0.1917 |
|   | 0.5 | 1.750 | 0.5539 | 0.2383 |
| * | 1.0 | 3.500 | 0.7869 | 0.3453 |
|   | 2.0 | 7.000 | 1.1196 | 0.5035 |
| * | 5.0 | 17.500 | 1.7698 | 0.7951 |
|   | 10.0 | 35.000 | 2.4900 | 1.0955 |
| * | 20.0 | 70.000 | 3.4997 | 1.4993 |

An operation of each step shown in FIGS. 2Ai and 2Aii will be described below.

Step S1: The controller 52 closes the shutter 33 and controls the optical attenuator 31 to set optical power expected to be output when the shutter 33 is open.

The power detector 34 outputs a monitor signal corresponding to optical power output from the splitting circuit 32.

Steps S2 and S3: The control data generator 4 receives the monitor signal from the power detector 34, and reads out first and second control amounts corresponding to the level of the monitor signal from the memory 4a and outputs them. The first control amount is directly output to the cooler 12 and used to cool the absorber 11. The control conditions of the cooler 12 are permanently held.

The second control amount output from the memory 4a of the control data generator 4 is supplied to the heater 11a via the heater controller 54 and held.

Steps S4 and S5: The isotherm determining unit 53 checks in accordance with temperature difference data from the temperature sensor 13 whether the temperatures of the temperature reference jacket 1 and the absorber 11 are equalized, and outputs the temperature difference data to the heater controller 54.

This determination is executed in consideration of a measurement error and a thermal response such that isotherm is determined when the temperature difference falls within the range of K % (e.g., ±0.1%) within t seconds (e.g., 15 seconds) and is not determined in other cases.

When the isotherm determining unit 53 does not determine isotherm, the heater controller 54 adds a control amount corresponding to the temperature difference data to the second control amount and outputs the total control amount to the heater 11a, thereby finely controlling the heater 11a (the above first and second and a third control amount to be described later correspond to a schematic offset control amount). This control is continuously performed by a closed loop operation having the temperature sensor 13 and the isotherm determining unit 53 as a feedback route until the temperature difference disappears, i.e., until the temperatures of the temperature reference jacket 1 and the absorber 11 are equalized.

Step S6: The data processor 6 which receives an isotherm indication signal output when the isotherm determining unit 53 determines isotherm stores the total control amount used to control the heater 11a as a first isothermal control amount $P_{h1}$ given by the following equation (2):

$$P_{h1} = 2P_a + \alpha \qquad (2)$$

where $\alpha$ is a control amount including positive and negative signs and obtained by the closed loop operation via the temperature sensor 13 and the isotherm determining unit 53.

Step S7: The controller 52 receives the determination result indicating the isotherm from the isotherm determining unit 53 and controls the shutter 33 to be open, thereby inputting light to the absorber 11. The third control amount is supplied instead of the second control amount from the control data generator 4 to the heater 11a via the heater controller 54. At this time, the first control amount supplied to the cooler 12 is held.

Steps S8 and S9: In this state, the isotherm determining unit 53 and the heater controller 54 perform isothermal control as in steps S4 to S6.

Step S10: The data processor 6 which receives the isotherm indication signal output when the isotherm determining unit 53 determines the isotherm stores the control amount supplied to the heater 11a as a second isothermal control amount $P_{h2}$ given by the following equation (3):

$$P_{h2} = P_a + \beta \qquad (3)$$

where $\beta$ is a control amount including positive and negative signs and obtained by the closed loop operation via the temperature sensor 13 and the isotherm determining unit 53.

During steps S1 to S10, the output from the power detector 34 may be used to monitor the presence/absence of a power variation and a variation amount of the light source 2 (this power variation monitoring function is similarly used in conventional techniques).

Step S11: The data processor 6 calculates and outputs optical power $P_i$ input to the absorber 11 by substituting the first and second isothermal control amounts $P_{h1}$ and $P_{h2}$ in the above equation (1) as follows:

$$P_i = E(P_{h1} - P_{h2}) + P_r = E(P_a\alpha - \beta) \quad (4)$$

where $Pr = 0$.

If DC voltages ($V_1$ and $V_2$) are output from the heater controller 54, the first and second isothermal control amounts ($P_{h1}$ and $P_{h2}$) are obtained as follows:

$$P_{h1} = (V_1)^2/R$$

$$P_{h2} = (V_2)^2/R$$

where R is the resistance of the heater 11a.

In this embodiment, the data processor 6 calculates the first and second isothermal control amounts ($P_{h1}$ and $P_{h2}$) on the basis of the voltages $V_1$ and $V_2$ output from the heater controller 54 and the heater resistance R as described above and then stores them.

FIG. 3A schematically shows a relationship between the above control amounts, input optical power, measurement values, and a time.

Steps S12 to S14: In order to measure the optical power $P_i$ input to the absorber 11 N times to obtain its average value, standard deviation, and the like, measurement items and measurement times N are designated by using the operation unit 9. In this case, each time the data processor 6 completes measurement, the controller 52 receives a completion signal to count the number of measurements, and compares the counted number with the designated number N, thereby controlling the respective constituent elements to repeatedly perform the operation from steps S1 to S11.

In the above N-time measurement, when the first and second isothermal control amounts $P_{h1}$ and $P_{h2}$ obtained upon the (N−1)th measurement are used as the second and third control amounts upon the Nth measurement, the measurement can be executed at a higher speed (as is apparent from FIG. 3A). For this purpose, the heater controller 54 may read out the first and second isothermal control amounts $P_{h1}$ and $P_{h2}$ in the (N−1)th measurement from the data processor 6 and set them for the heater 11a.

Arithmetic operations for calculating the average value or the standard deviation may be performed by the data processor 6.

Step 15: When the N-time measurement is not to be performed, the obtained power value is immediately displayed on the display unit 8 via the display controller 7 in steps S11 and S12. In order to perform the N-time measurement, an average power value or a standard deviation power value is displayed via steps S11 to S14.

FIGS. 2B and 2C show detailed contents displayed on the display unit 8 upon isothermal control and optical power measurement.

Figure 3B:
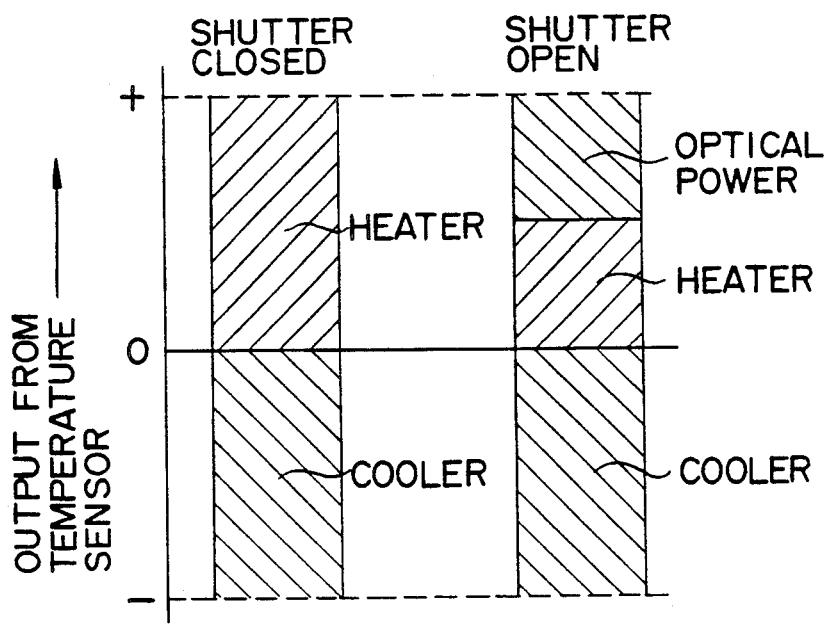

As is apparent from the equations (2), (3), and (4), the present invention described above is characterized in that if the first, second, and third control amounts output from the control data generator 4 are optimal control amounts, the control amounts $\alpha$ and $\beta$ become substantially 0, and no isothermal control by the closed loop operation need be performed (FIG. 3A schematically shows the case in which the first, second, and third control amounts are not optimal amounts). That is, ideally, the operation is executed by only setting the first, second, and third control amounts and checking whether the temperatures of the temperature reference jacket 1 and the absorber 11 are equalized. Actually, the isothermal control is sometimes required. Since, however, the control amounts are small, the measurement speed is very high (about 12 minutes). The measurement time can be reduced by about 1/5 that in optical power measurement by using a conventional calorimeter. These results are apparent from FIG. 3A and FIGS. 3B and 3C to be described below.

Figure 3C:
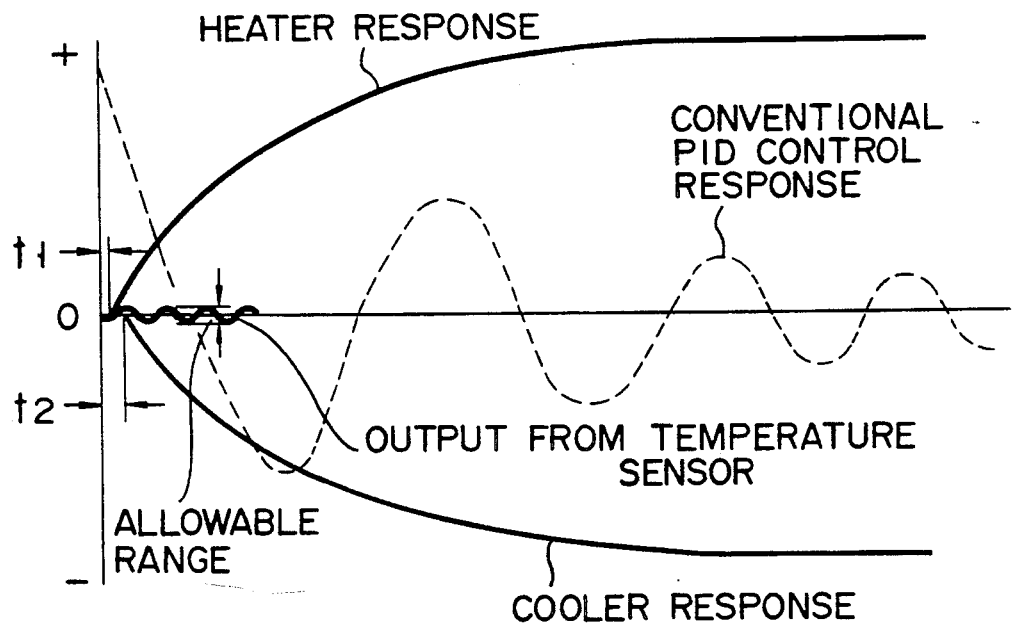

FIGS. 3B and 3C clearly shows the feature of the isothermal control according to the present invention for better understanding. That is, in the present invention, balanced control amounts are given by the initialization described above to the cooler 12 and the heater 11a from almost the beginning of the operation, thereby obtaining a isothermal state within a very short time period. Therefore, unlike in a conventional system, the control can be executed without causing a ringing phenomenon.

Note that the heater controller 44 may be arranged such that the coefficient based on the temperature difference from the isotherm determining unit 53 and the second or third control amount from the control data generator 4 are multiplied by a multiplier and output as the first or second isothermal control amount. The heater controller 54 may include an adder. In addition, the equations (2), (3), and (4) are given in the forms which can be easily understood, and the forms of these equations depend on a detailed arrangement of the heater controller 54.

In the above description, the cooler 12 and the heater 11a are substantially simultaneously controlled. In an actual operation, however, in consideration of the thermal time constant and the response characteristic of each unit, delay times $t_1$ and $t_2$ are used to control the heater and the cooler, respectively, thereby reducing a time required to obtain an isothermal state as a whole, as shown in FIG. 3C. Table 2 shows measurement values of $t_1$ and $t_2$.

TABLE 2

| Shutter | Control Delay Time (sec) | | Cooler (t₂) |
|---------|---------|---------|---------|
| | Heater (t₁) | | |
| | Light OFF | Light ON | |
| open | 0.2 | 0.22 | 2.2 |

Figure 3D:
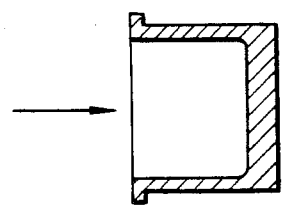
FIG. 3D is a sectional view showing an example of an absorber.

Table 2 shows the results obtained when a pot-like absorber as shown in FIG. 3D is used as the absorber 11. This absorber is created by etching on the electroless nickel-phosphorus alloy having a surface structure constituted by a large number of honeycomb adjacent small recesses on an inner surface of a pot-like base material consisting of copper. The inner wall of each recess has a fine three-dimensional structure. Such an absorber a small total reflectivity and wavelength dependency with respect to input optical power, i.e., has very light absorption characteristics. Therefore absorber can be suitably used as a light receiver an optical calorimeter.

Tables 1 to 4 show the memory data obtained from measurement values under the conditions of Japan (room temperature=23° C.). The values, however, may be corrected in accordance with the conditions of a country in which optical power is to be measured (difference in an area and a room temperature).

Figure 3E:
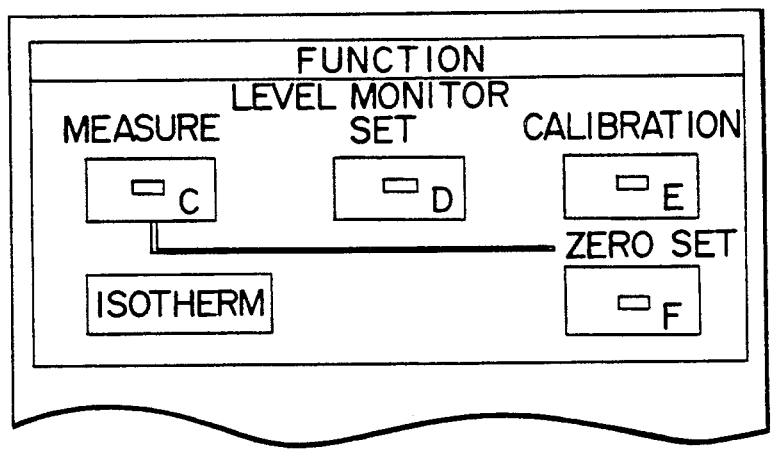
FIGS. 3E to 3G are views showing an operation section according to correction of a memory table used in the embodiment shown in FIGS. 1A to 1C, a sequence of the correction, and a detailed example of the correction, respectively.
Figure 3F:
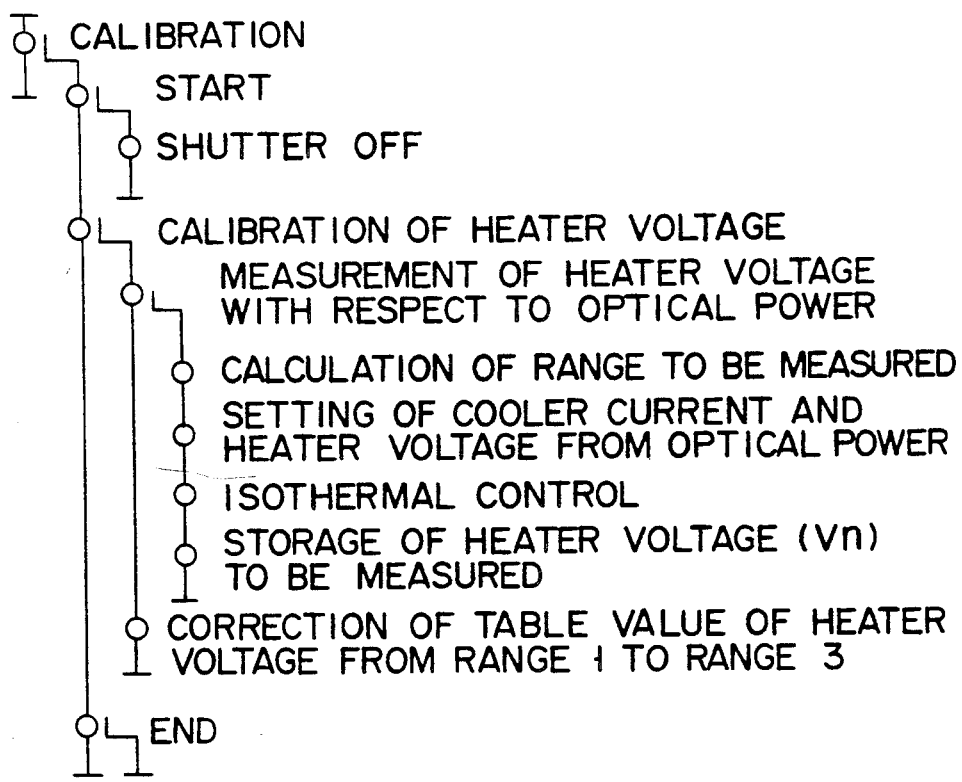

In the present invention, therefore, the memory data can be corrected by a sequence as shown in FIG. 3F by depressing a CALIBRATION key (FIG. 3E) of the operation unit 9.

That is, this correction is executed by correcting a table value of a heater voltage on the basis of a cooler (Peltier) current with respect to optical power to be measured.

Referring to FIG. 3F, isothermal control is performed such that a heater set value is finely adjusted while a cooler current set value is fixed, thereby eliminating a temperature difference between the reference jacket 1 and the absorber 11.

During this correction, the cooler current and the heater voltage are set by using typical values stored in the memory.

More specifically, the heater voltage at some points indicated by symbol * in Table 1 are measured, and then correction is executed. Correction is executed for all heater voltage values before optical power input with respect to the table. An error is given by the following equation:

$$\text{error }(\%) = \frac{|(\text{table value}) - (\text{measurement value})|}{(\text{table value})} \times 100$$

If, however, the obtained heater voltage set value falls outside the range of ±0.1% of a value calculated from a straight line connecting before and after the set value, a linearly approximated value is preferentially used.

Figure 3G:
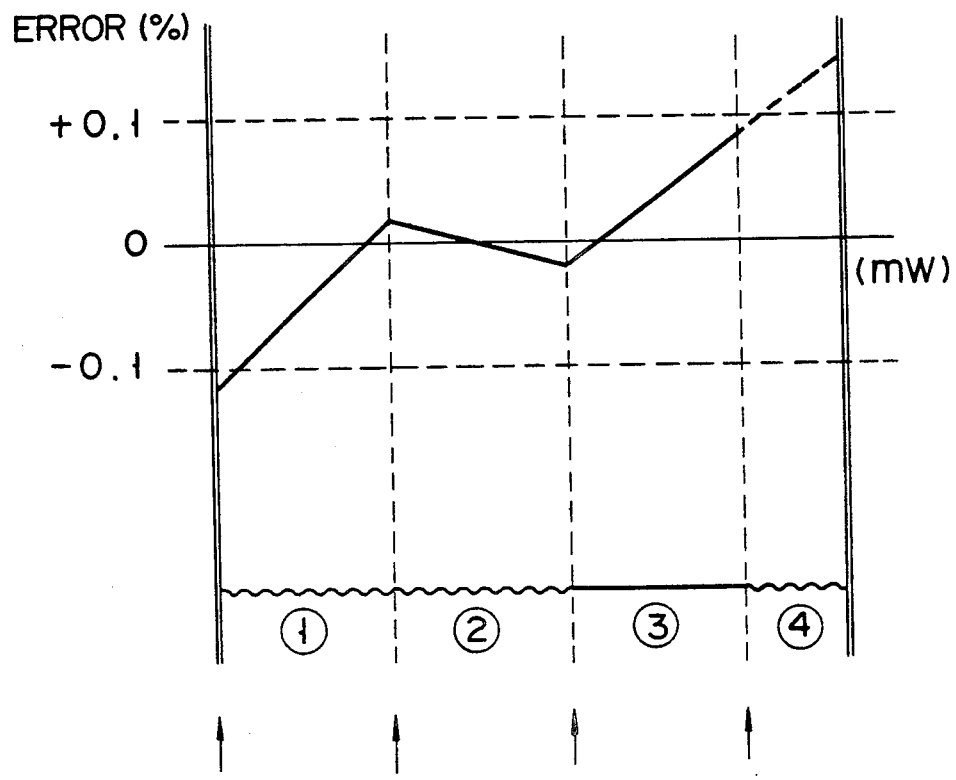

More specifically, in a case as shown in FIG. 3G (in which the heater voltage is converted into DC power (mW)), processing is executed as shown in Table 3.

TABLE 3

| Correction Interval | Correction Contents |
| --- | --- |
| ① | The interval is linearly approximated |
| ② | The interval is not corrected since it falls within the range of ±0.1% |
| ③ | The interval is linearly approximated since the right end point of 4 exceeds ±0.1% |
| ④ | |

The following operations are performed on the basis of the above conditions. I) If one end point of a measurement interval exceeds ±0.1%, the interval is corrected by linear approximation.

II) If an end point is not measured as in the case of ④, a point obtained by elongating the straight line of an adjacent interval is used to perform correction throughout the two intervals.

In table shown in Table 1, some points other than some points indicated by symbol * are interpolated by linear approximation. (Since a considerably long time is required to measure all the points, correction is performed by using a representative value of each range).

Figure 3H:
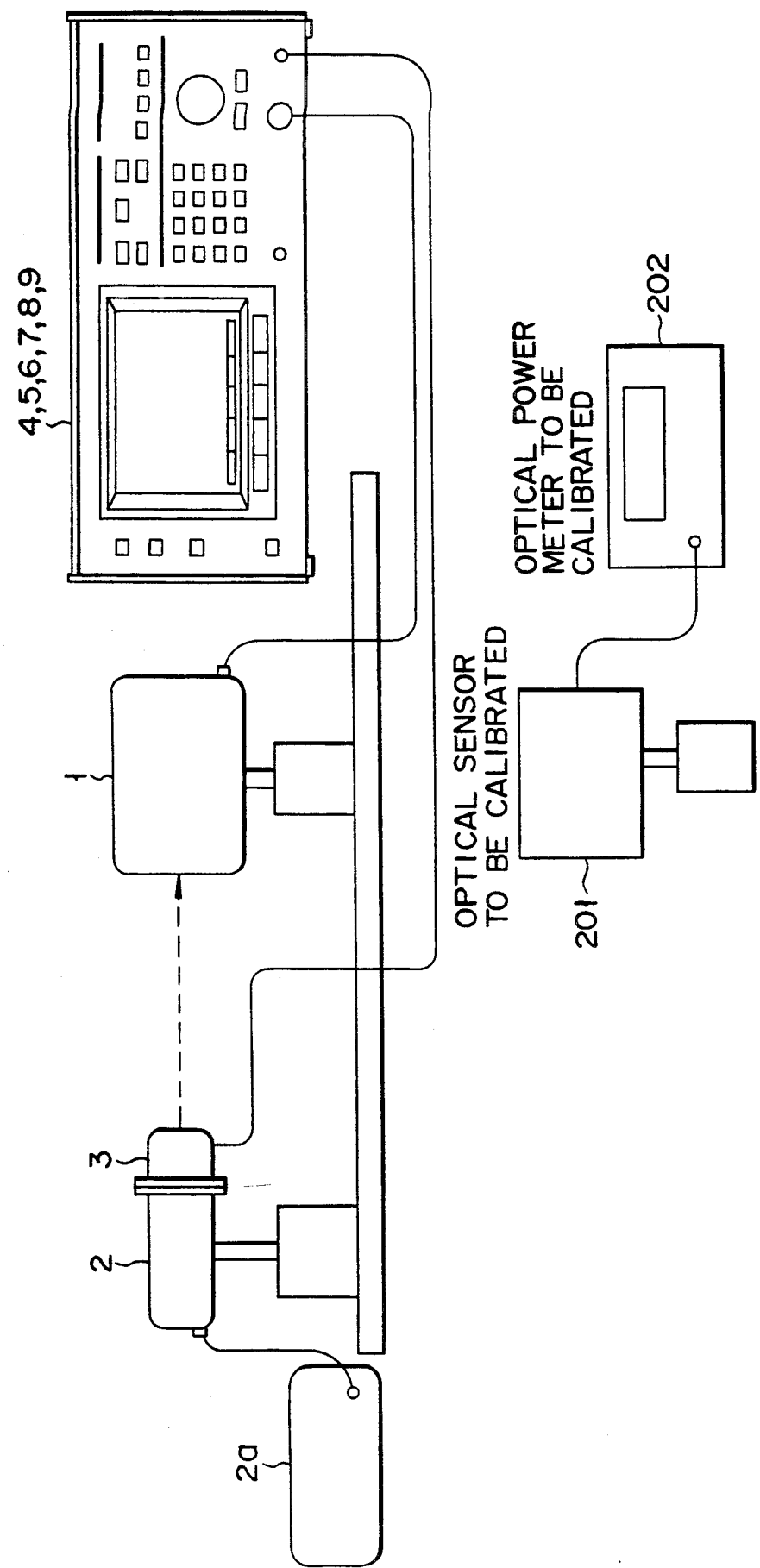
FIG. 3H is a view showing a system arrangement for calibrating an optical power meter to be calibrated by using the apparatus shown in FIGS. 1A to 1C.

Since the present invention can execute precise measurement, the present invention is used to calibrate optical power output from a light source 2 or measurement accuracy of an optical power meter for measuring the optical power in an arrangement as shown in FIG. 3H.

That is, when correct optical power $P_i$ measured by the present invention is input to an optical power meter 202 to be calibrated via an optical sensor 201, an error (%) of a value $P_L$ measured and indicated by the optical power meter to be calibrated is given by the following equation (5):

$$\text{error} = \{(P_i - P_L)/P_L\} \times 100 \quad (5)$$

SECOND EMBODIMENT

An arrangement of the second embodiment of the present invention is shown in FIG. 4.

In the embodiment shown in FIG. 4, a heater 11a is constituted by a plurality of heaters, i.e., a coarse adjustment heater 11a1 and a fine adjustment heater 11a2. In the first embodiment, the second or third control amount (i.e., a coarse control amount) and the isothermal control amount obtained when the shutter 33 is closed or open are added to each other by a heater controller 54 and applied to the heater 11a as a total control amount. In this embodiment, however, control amounts of the two heaters 11a1 and 11a2 are added as the calories by an optical absorber 11.

Therefore, although a process of the second embodiment is basically similar to that of the first embodiment, operations of a control data generation section 4, an isothermal control section 5, and a data processor 6 are changed as follows.

The control data generator 4 outputs a first control amount to control a cooler 12 on the basis of optical power detected by the power detector 34, and directly outputs second and third control amounts to control the coarse adjustment heater 11a1 of the heater 11a in correspondence with closing and opening of the shutter 33.

The isothermal control section 5 controls opening and closing of the shutter 33 by using a controller 52, and upon each opening and closing control, finely controls the fine adjustment heater 11a2 of the heater 11a on the basis of temperature difference data from a temperature sensor 13 by using a heater controller 54 via an isotherm determining unit 53, thereby obtaining temperature equilibrium between the absorber 11 and the temperature reference jacket 1. The isothermal control section 5 stores control amounts, used to control the fine adjustment heater 11a2 when the temperature equilibrium is obtained, by using the data processor 54 in correspondence with opening and closing of the shutter 33 as opening and closing isothermal control amounts.

The data processor 6 calculates a total control amount used to control the heater 11a when the shutter 33 is closed, i.e., a first isothermal control amount $P_{h1}$ by the following equation (6):

$$P_{h1} = (\text{2nd control amount}) + (\text{closing temperature equalization control amount}) \quad (6)$$

The unit 6 calculates a total control amount when the shutter 33 is open, i.e., a second isothermal control amount $P_{h2}$ by the following equation (7):

$$P_{h2} = (\text{3rd control amount}) + (\text{open temperature equalization control amount}) \quad (7)$$

and calculates input power $P_i$ by the following equation (8):

$$P_i = E(P_{h1} - P_{h2}) \quad (8)$$

The other operation and process are the same as those described in the first embodiment.

As has been described above, according to the present invention, the control data generator is used to store initial (measurement/control) conditions corresponding to input optical power in the memory and to generate them, and the measuring means is provided to cause the control data generator to set the initial conditions to execute isothermal control on the basis of a monitor signal, thereby precisely measuring the optical power. Therefore precise measurement can be effectively executed at a high speed e.g., at a short and real time. Since the measurement can be executed at a high speed, an influence of changes in external environment in the measurement can be effectively reduced.

In addition, the present invention can be automatically performed. Especially in the apparatus, an integral structure can be obtained, and the operation portions can be concentrated. Therefore, the operability and the compactness of the apparatus can be improved.

According to the present invention, therefore, in an optical power measuring method and apparatus by using a calorimeter for converting optical power into the calories and precisely measuring the optical power, there is provided a measuring method and apparatus which solves a problem of a long measurement time due to a specific thermal time constant in measurement using a calorimeter, which can increase the measurement speed, and which can be easily used.

Since precise measurement can be performed according to the present invention, there is provided an optical calorimeter system effectively used to calibrate optical power output from a light source and measurement accuracy of an optical power meter for measuring the optical power.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A method for measuring optical power using an optical calorimeter which has a temperature reference jacket including an optical absorber for absorbing optical power to be measured and generating heat, an electronic cooler and an electric heater thermally connected to said optical absorber, and a temperature sensor for detecting a temperature difference between said temperature reference jacket and said optical absorber, the method comprising:

storing in advance first, second, and third control amounts corresponding to an optical power to be measured, the first and second control amounts being stored as a cooler power for said electronic cooler and a heater power for said electric heater sufficient to control said optical calorimeter in a substantially isothermal state between optical absorber and said temperature reference jacket, and the third control amount being stored as a heater power for said electric heater corresponding to the optical power to be measured;

monitoring the optical power to be measured while the optical power to be measured is transmitted to or shielded from said optical absorber of said optical calorimeter;

first controlling said optical calorimeter in the substantially isothermal state by reading out the first and second control amounts and supplying the first and second control amounts at substantially the same time to said electronic cooler and to said electric heater, in accordance with the monitoring results of the optical power to be measured, and by finely adjusting the heater power in accordance with the temperature difference from said temperature sensor, while the optical power to be measured is shielded from said optical absorber of said optical calorimeter;

first detecting a first isothermal control amount for the heater power obtained when the substantially isothermal state is achieved in said first controlling step;

second controlling said optical calorimeter in the substantially isothermal state by continuously supplying the first control amount to said electronic cooler, reading out the third control amount instead of the second control amount and supplying the third control amount to said electric heater, and by finely adjusting the heater power in accordance with the thermal difference from said temperature sensor, while the optical power to be measured is transmitted to said optical absorber of said optical calorimeter;

second detecting a second isothermal control amount for the heater power obtained when the substantially isothermal state is achieved in said second controlling step; and calculating the optical power to be measured in accordance with the first and second isothermal control amounts for the heater power, detected in said first and second detecting steps.

2. A method according to claim 1, wherein said method further comprises:

calibrating the second control amount to be stored in advance, in accordance with a temperature condition of an area in which measurement of the optical power is to be executed.

3. A method according to claim 1, wherein the first control amount is supplied, to said optical calorimeter, delayed by a predetermined period after the second control amount is supplied.

4. A calorimetric optical power measuring apparatus comprising:

a temperature reference jacket including an optical absorber for absorbing optical power to be measured and generating heat, an electronic cooler and an electric heater thermally connected to said optical absorber, and a temperature sensor for detecting a temperature difference between said temperature reference jacket and said optical absorber;

monitoring means for monitoring the optical power to be measured;

optical path control means for selectively transmitting or shielding the optical power to be measured with respect to said optical absorber in said temperature reference jacket;

memory means for storing in advance first, second, and third control amounts corresponding to the optical power to be measured, the first and second control amounts being stored as a cooler power for said electronic cooler and a heater power for said electric heater sufficient to control said temperature reference jacket and said optical absorber in a substantially isothermal state, and the third control amount being stored as a heater power for said electric heater corresponding to the optical power to be measured;

first control means for supplying to said optical path control means a first control signal for shielding the optical power to be measured from said optical absorber, for outputting, in accordance with the monitoring results of the optical power to be measured from said monitoring means, a second control signal for reading out corresponding first and second control amounts from said memory means and supplying the first and second control amounts to said electronic cooler and said electric heater at substantially the same time, and for outputting, in accordance with temperature difference data from said temperature sensor, a third control signal for finely adjusting said electric heater so that said temperature reference jacket and said optical absorber are controlled in the isothermal state, said first control means including isotherm determining means for determining the isothermal state in accordance with the temperature difference data while the optical power to be measured is shielded from said optical absorber;

second control means for supplying, in accordance with the result from said isotherm determining means of said first control means, to said optical path control means, a fourth control signal for transmitting the optical power to be measured to said optical absorber in said temperature reference jacket, for outputting, in accordance with the monitoring result of the optical power to be measured from said monitoring means, a fifth control signal for reading out corresponding first and third control amounts from said memory means and supplying the first and third control amounts to said electronic cooler and said electric heater, and for outputting, in accordance with temperature difference data from said temperature sensor, a sixth control signal for finely adjusting said electric heater so that said temperature reference jacket and said optical absorber are controlled in the isothermal state, said second control means including isotherm determining means for determining the isothermal state in accordance with the temperature difference data while the optical power to be measured is incident on said optical absorber; and data processing means for storing a first isothermal control amount for the heater power obtained when said isotherm determining means of said first control means determines the isothermal state and a second isothermal control amount for the heater power obtained when said isotherm determining means of said second control means determines the isothermal state, and calculating the optical power to be measured in accordance with the first and second isothermal control amounts.

5. An apparatus according to claim 4, wherein said monitoring means includes means for splitting the optical power to be measured and means for detecting optical power split by said splitting means.

6. An apparatus according to claim 4, wherein said monitoring means includes an optical attenuator for altering optical power from a light source to a value corresponding to a set value.

7. An apparatus according to claim 4, wherein said apparatus further comprises display means for displaying the optical power to be measured calculated by said data processing means.

8. An apparatus according to claim 7, wherein said display means includes means for displaying at least a process while said isotherm detecting means of said first control means determines an isothermal state.

9. An apparatus according to claim 4, wherein said apparatus further comprises calibrating means for correcting the second and third control amounts to be stored in advance in said memory means, in accordance with a temperature condition in which measurement of the optical power to be measured is to be executed.

10. An apparatus according to claim 4, wherein said first control means supplies the first control amount to be supplied to said electronic cooler, delayed by a predetermined period after the second control amount to be supplied to said electric heater.

* * * * *